US008306944B2

(12) United States Patent
Kim et al.

(10) Patent No.: US 8,306,944 B2
(45) Date of Patent: Nov. 6, 2012

(54) APPARATUS, METHOD AND SYSTEM FOR PROVIDING CONTENT OF MEDIA SERVER

(75) Inventors: Joo-Hyun Kim, Anyang-si (KR); Joon-Ho Cho, Suwon-si (KR); Yoon-Soo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 475 days.

(21) Appl. No.: 11/948,385

(22) Filed: Nov. 30, 2007

(65) Prior Publication Data

US 2009/0019006 A1    Jan. 15, 2009

(30) Foreign Application Priority Data

Jul. 13, 2007 (KR) .................. 10-2007-0070839

(51) Int. Cl.
*G06F 7/00* (2006.01)
*G06F 17/00* (2006.01)
(52) U.S. Cl. ...................................... 707/602
(58) Field of Classification Search .............. 707/602
See application file for complete search history.

(56) References Cited

U.S. PATENT DOCUMENTS

| | | | |
|---|---|---|---|
| 2005/0033657 A1* | 2/2005 | Herrington et al. | 705/26 |
| 2006/0161635 A1* | 7/2006 | Lamkin et al. | 709/217 |
| 2006/0173985 A1* | 8/2006 | Moore | 709/223 |
| 2006/0190616 A1* | 8/2006 | Mayerhofer et al. | 709/231 |
| 2006/0191635 A1* | 8/2006 | Hasegawa et al. | 156/345.11 |
| 2006/0195465 A1* | 8/2006 | Atchison et al. | 707/102 |
| 2006/0265427 A1* | 11/2006 | Cohen et al. | 707/200 |
| 2007/0049258 A1* | 3/2007 | Thibeault | 455/414.1 |
| 2007/0061266 A1* | 3/2007 | Moore et al. | 705/51 |
| 2007/0258474 A1* | 11/2007 | Kim et al. | 370/401 |
| 2009/0019006 A1* | 1/2009 | Kim et al. | 707/3 |

FOREIGN PATENT DOCUMENTS

| | | |
|---|---|---|
| JP | 2005-346213 A | 12/2005 |
| JP | 2006-139470 A | 6/2006 |
| JP | 2006-209598 A | 8/2006 |
| JP | 2006-331292 A | 12/2006 |
| JP | 2007-141033 A | 6/2007 |
| KR | 10-2005-0062849 A | 6/2005 |
| KR | 10-2006-0114785 A | 11/2006 |
| KR | 10-2007-0008478 A | 1/2007 |
| WO | WO 2006/124268 A2 | 11/2006 |

OTHER PUBLICATIONS

Office Action issued Apr. 17, 2012 by the Japanese Patent Office in counterpart Japanese Application No. 2008-044257.
Uzuo, Hidekatsu et al. "Intra-school Web Information Integration for University Portal", Jul. 6, 2005, Version 1.1, pp. 465-468.
Communication dated Dec. 23, 2011, issued by the State Intellectual Property Office of the People's Republic of China in corresponding Chinese Patent Application No. 200810108914.4.

* cited by examiner

*Primary Examiner* — Robert Beausoliel, Jr.
*Assistant Examiner* — Nicholas Allen
(74) *Attorney, Agent, or Firm* — Sughrue Mion, PLLC

(57) ABSTRACT

Provided are an apparatus, a method and a system for providing content in a media server, and, more particularly, an apparatus, a method and a system for providing content in a media server, in which content in the media server can be expressed as RSS data which can allow users to access the content through an RSS reader. The apparatus includes an RSS-converting unit which converts content information collected through a browse action or a search action into RSS data, and a web service unit which provides RSS data generated by the RSS-converting unit to external devices.

11 Claims, 11 Drawing Sheets

| | RSS 2.0 | | UPNP-CONTENT-DISCOVERY SERVICE |
|---|---|---|---|
| essential component | title | CHANNEL TITLE | dc:title |
| | link | WEBSITE URL | Presentation URL |
| | description | CHANNEL DESCRIPTION | upnp:longDescription<br>dc:description |
| optional component | language | CHANNEL LANGUAGE [KO] | USER SETTING [DEFAULT KOREAN:KO] |
| | copyright | CHANNEL INFORMATION RIGHTS | Dc:rights |
| | manageingEditor | MANAGER E-MAIL ADDRESS | dc:createor |
| | webMaster | WEBMASTER E-MAIL ADDRESS | dc:createor |
| | pubDate | PUBLICATION DATE [RFC 822 FORMAT] | CONTAINER FOUND DATE |
| | lastBuildDate | LAST BUILD DATE | CONTAINER FOUND DATE + LAST EVENT SENT DATE |
| | category | CATEGORY INFOMATION | UPNP:CLASS PROCESS |
| | generator | CHANNEL-GENERATING PROGRAM | Samsung Media Server RSS Service |
| | docs | RSS URL | - |
| | cloud | SUBSCRIBE NOTIFICATION INTERFACE | - |
| | ttl | PERIODIC CHANNEL RENEWAL | USER SETTING |
| | image | IMAGE INFORMATION | upnp:icon |
| | rating | Rating | N/A |
| | textInput | TEXT INPUT BOX AND SUBMIT BUTTON LINKED TO SERVER SCRIPT | N/A |
| | skipHours | SKIPPED HOURS | N/A |
| | skipDays | SKIPPED DAYS | N/A |

FIG. 4B

| | RSS 2.0 | | UPNP-CONTENT-DISCOVERY SERVICE |
|---|---|---|---|
| essential component | Title | ITEM TITLE | dc:title |
| | Link | URL | URL |
| | Description | DESCRIPTION | upnp:longdescription<br>dc:description<br>upnp:artist<br>upnp:album<br>dc:contributor |
| | Author | AUTHOR E-MAIL ADDRESS | dc:createor |
| | Category | CATEGORY | upnp:class |
| | Comments | RELEVANT URL INFORMATION | N/A |
| | Elcosure | ADDITIONAL MEDIA INFORMATION | N/A |
| | Guid | IDENTIFIER | |
| | pubDate | PUBLICATION DATE | Dc:date |
| | Source | SOURCE | |

FIG. 5

```xml
<?xml version="1.0" encoding="utf-8" ?>
<rss version="2.0" xmlns:media="http://www.sec.co.kr/rssservice/">
  <channel>
    <title>Video Channel</title>
    <link>http://localhost:8080/MediaServerRSS.xml</link>
    <image>
        <url>http://localhost:8080/MediaServer.gif</url>
        <link>http://localhost:8080</link>
        <title>Video</title>
        <height>63</height>
        <width>123</width>
    </image>
    <description>DMS's Video Channel.</description>
    <item>
        <author>joohyune.kim@samsung.com</author>
        <title>Test video</title>
        <link>http://localhost:8080/afternoon.avi</link>
        <description>
          <![CDATA[
            <embed src="http://localhost:8080/afternoon.avi"
            play="true" loop="true" quality="high">
                                        <p>
                                        Home video
                                        </p>

]]>
        </description>
    </item>
  </channel>
</rss>
```

APPARATUS, METHOD AND SYSTEM FOR PROVIDING CONTENT OF MEDIA SERVER

CROSS-REFERENCE TO RELATED APPLICATION

This application claims priority from Korean Patent Application No. 10-2007-0070839 filed on Jul. 13, 2007 in the Korean Intellectual Property Office, the disclosure of which is incorporated herein in its entirety by reference.

BACKGROUND OF THE INVENTION

1. Field of the Invention

Apparatuses, methods and systems consistent with the present invention relate to providing content of a media server, and more particularly, to providing content in a media server by formatting the content in the media server as really simple syndication (RSS) formatted information that can allow users to access the content through an RSS reader.

2. Description of the Related Art

Generally, in a conventional network having a media server and a media controller, content in the media server is searched for by the media controller by requesting the media server to perform a browse action. The media server then generates a list of items in sub-containers within a main container.

When a user searches for content in the media server, the media server typically searches containers and items matching the search criteria and generates a list. Additionally, the media server transmits updates on added and deleted information to the media controllers that have been registered for event updates.

Content in the media server is generally separated into containers and items. The containers have sub-containers and items, and the items have sub-entities. Additionally, in channels defined by RSS, although items may exist in the channels, sub-channels may not exist in the channels. RSS is a way of providing convenient access and interface between many content providers and individual subscribers, which allows users to easily access various content such as news, user created content (UCC), and blogs from many websites through an RSS reader. The RSS reader simplifies the inconvenient process of directly accessing many websites to search for content, which makes it possible to obtain content from registered sites 24 hours a day without the need to directly access content from each site.

To use an RSS service, a user initially registers channels corresponding to RSS service providers using the RSS reader, which periodically accesses the uniform resource locator (URL) of the RSS service providers according to option settings, to obtain items corresponding to the registered channels. Further, content is regularly updated when the RSS reader periodically connects to the channels. In RSS 2.0, a function which makes it possible to notify users of information on updated content through events can be provided by the channel providers.

However, the media controller needed to control the media server must comply with Universal Plug and Play (UPnP), which defines standards for media server devices, browser and search actions, events which notify changes in the containers, content directories, and connection manager services. Generally, UPnP interfaces are not provided in conventional Internet terminal devices, which presents a problem in accessing and using content through the Internet.

There is a further problem in that media servers which provide services to individual users do not operate 24 hours a day, and therefore access to content cannot be ensured.

Korean Patent Publication No. 2007-008478 entitled "IPTV RSS Service" discloses a set-top box embedded with an RSS reader, and an RSS server for managing user-feed data having RSS content. When a user requests RSS content through an Internet Protocol television (IPTV), the RSS reader searches content matching the request and parses the data to be displayed on the IPTV. Although providing an RSS service eliminates the need for having a PC constantly accessing updated news and blogs from websites, it does not disclose a technology for providing an RSS service for accessing content stored in a media server.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. The present invention enables users to access content in a media server through an RSS reader.

According to an aspect of the present invention, there is provided an apparatus for providing content stored in a media server, the apparatus including: an RSS-converting unit that converts content information collected through a browse action or a search action into RSS data; and a web service unit that provides RSS data generated by the RSS-converting unit to external devices.

According to another aspect of the present invention, there is provided a system for providing content in a media server, the system including: an RSS service agent which requests the media server to perform a browse action or a search action and converts content information collected through the browse action or the search action into RSS data; a media server which searches containers and items, and then generates and transmits content information, if the browse action or the search action has been requested by the RSS service agent; and an RSS reader which provides RSS data received from the RSS service agent.

According to another aspect of the present invention, there is provided a method of providing content stored in a media server, the method including: requesting the media server to perform a browse action or a search action; converting content information collected through the browse action or the search action into RSS data; and generating and providing RSS data based on the RSS data to an RSS reader.

BRIEF DESCRIPTION OF THE DRAWINGS

The above and other aspects of the present invention will become apparent by describing in detail exemplary embodiments thereof with reference to the attached drawings, in which.

DETAILED DESCRIPTION OF THE EXEMPLARY EMBODIMENTS

The above and other aspects of the present invention may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention is defined by the appended claims. Like reference numerals refer to like elements throughout the specification.

Hereinafter, the present invention will be described in detail with reference to the accompanying drawings.

Figure 1:
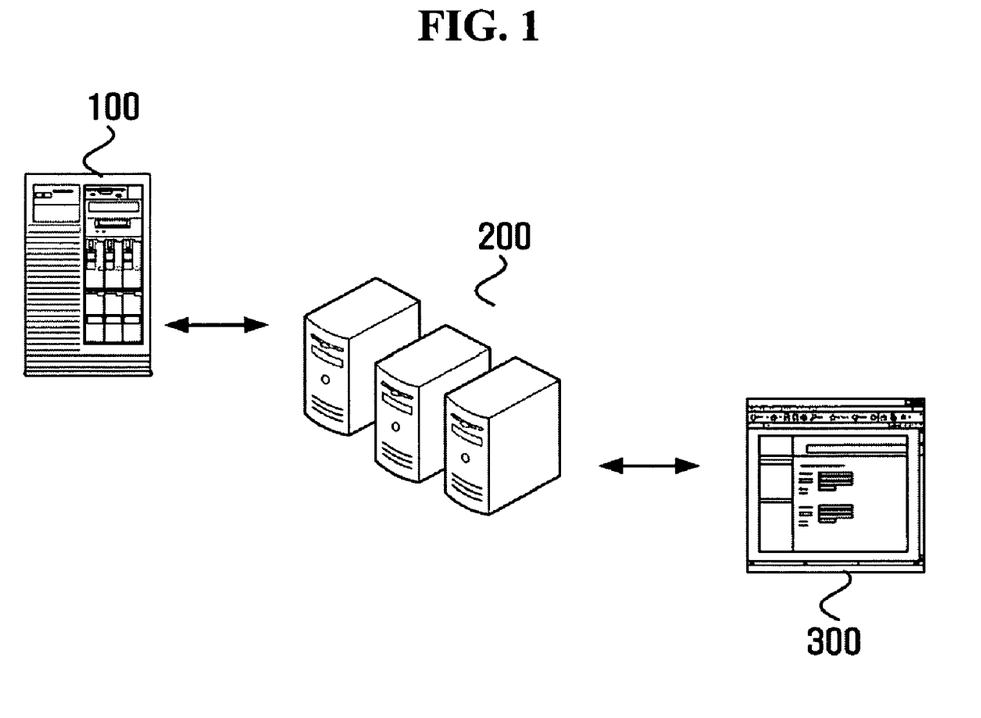
FIG. 1 is a diagram illustrating a system for providing content in a media server according to an exemplary embodiment of the present invention.

FIG. 1 is a diagram illustrating a system for providing content of a media server, according to an exemplary embodiment of the present invention.

A system for providing content of a media server includes a media server 100, an RSS service agent 200, which processes a UPnP action (for example, a browse action or a search action) and events to provide services by converting content information collected through the browse action or search action into RSS data, and an RSS reader 300. Here, the RSS service agent 200 may be included in the media server 100.

If a browse action or search action request is received from the RSS service agent 200, the media server 100 searches containers and items, and generates and transmits a list of searched content. The media server 100 also updates the RSS service agent 200 by transmitting events such as when containers have been added or deleted.

The RSS service agent 200 sends a browse or search action request to the media server 100, and converts the content information collected through the browse or search action into RSS data. Here, when the media server 100 receives a browse or search action request, a channel corresponding to the search action is provided and a channel corresponding to the search action is provided from a specific container. That is, the channel provided for the search action can be provided with various content according to search criteria settings, and the channel provided for the browse action can be provided without sub-containers or with a list of items in all the sub-containers.

Hereinafter, components of the channels and items in the channels will be described in detail by referring to FIGS. 4A and 4B.

The RSS reader 300 provides RSS data received from the RSS service agent 200. Components of RSS data will also be described in detail by referring to FIG. 5.

Figure 2:
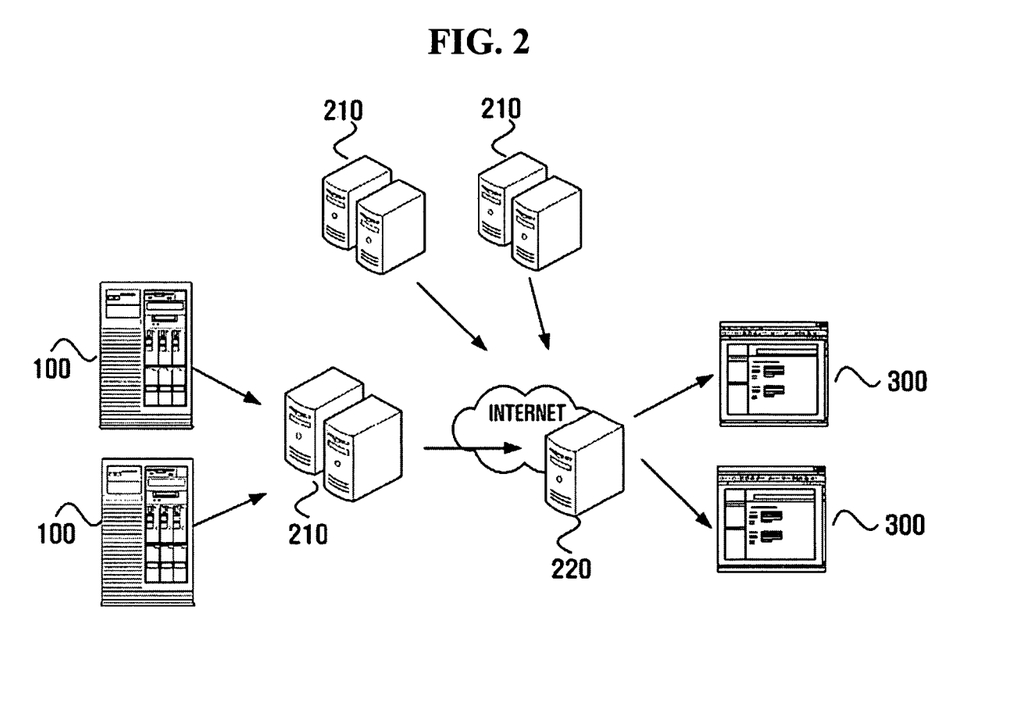
FIG. 2 is a diagram illustrating a system for providing content in a media server according to another exemplary embodiment of the present invention.

FIG. 2 is a diagram illustrating a system for providing content of a media server according to another exemplary embodiment of the present invention. The RSS service agent 200 includes a plurality of modules 210 which perform a conversion function (that is, an RSS-conversion function) that converts content information collected through the browse or search action, and a module 220 which performs a providing function (that is, a web service function) that provides an RSS service to the RSS reader 300. Here, the module which performs the web service function is available via the Internet to provide the RSS service to many users.

Figure 3:
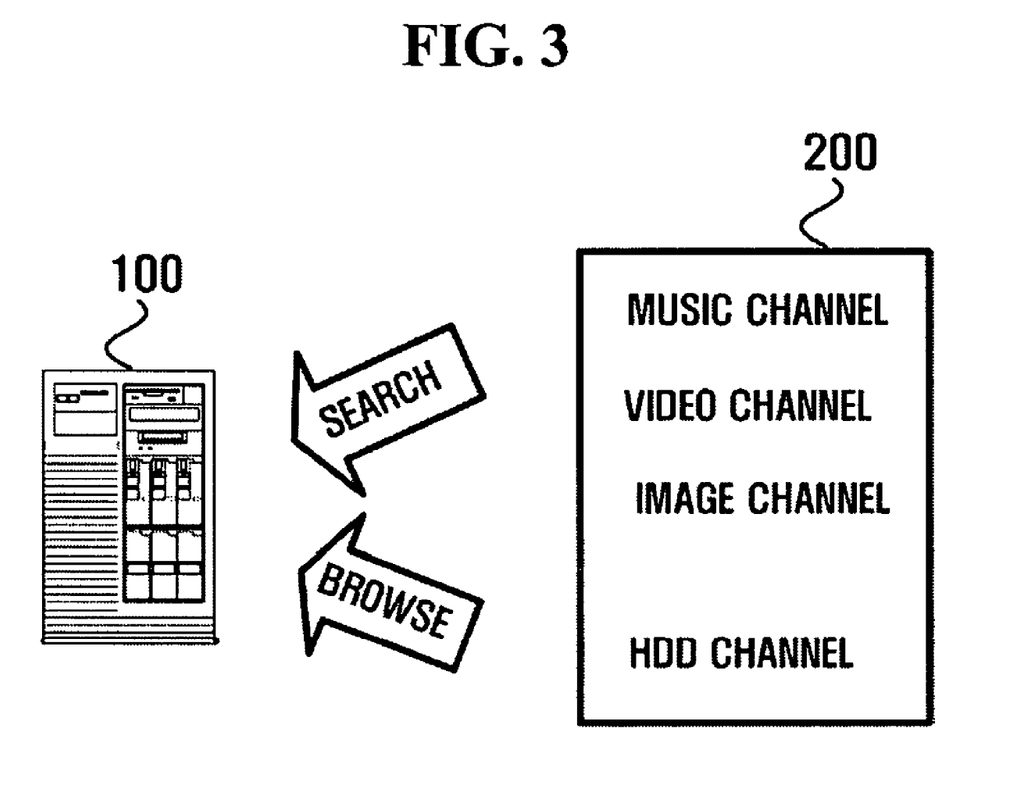
FIG. 3 is a diagram illustrating the operation of a search action and a browse action between a media server and an RSS service agent of the system for providing content in a media server according to an exemplary embodiment of the present invention.

FIG. 3 is a diagram illustrating the operation of the search action and the browse action between the media server and the RSS service agent of the system for providing content in a media server according to an exemplary embodiment of the present invention. Here, a channel provided for the search action can be provided with various content according to search criteria settings, and content of a specific channel is provided for the browse action.

As shown, the RSS service agent 200 sends a request for a search action to the media server 100 by setting channel search criteria, for example, a music channel.

The media server 100 then searches all containers and items for content of the music channel requested by the RSS service agent 200.

Thereafter, the media server 100 generates and sends a list of searched music content to the RSS service agent 200.

The RSS service agent 200 can also send a request for the browse action for a specific container, for example an hard disk drive (HDD) channel, to the media server 100.

Thereupon, the media server 100 searches the corresponding container, and generates and sends a list of HDD content to the RSS service agent 200.

Figure 4A:
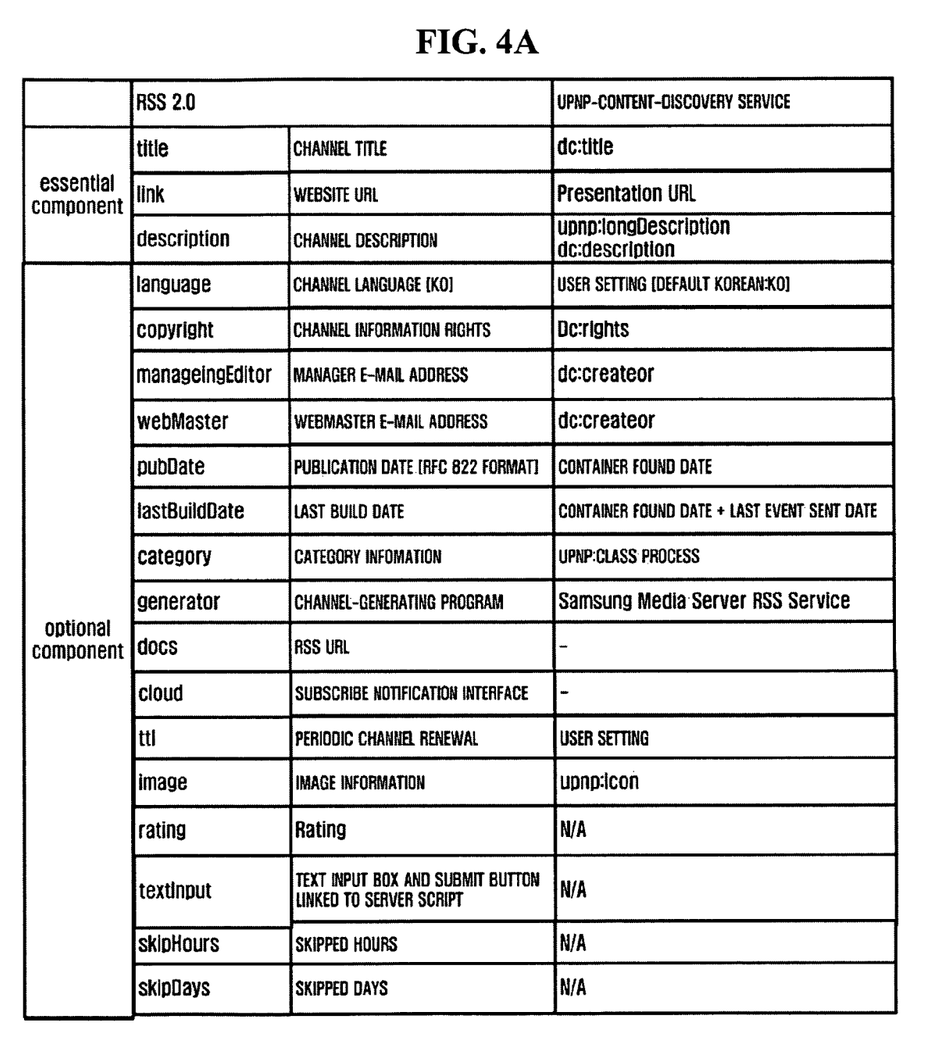
FIGS. 4A and 4B are diagrams illustrating components of a channel and an item according to an exemplary embodiment of the present invention.
Figure 4B:
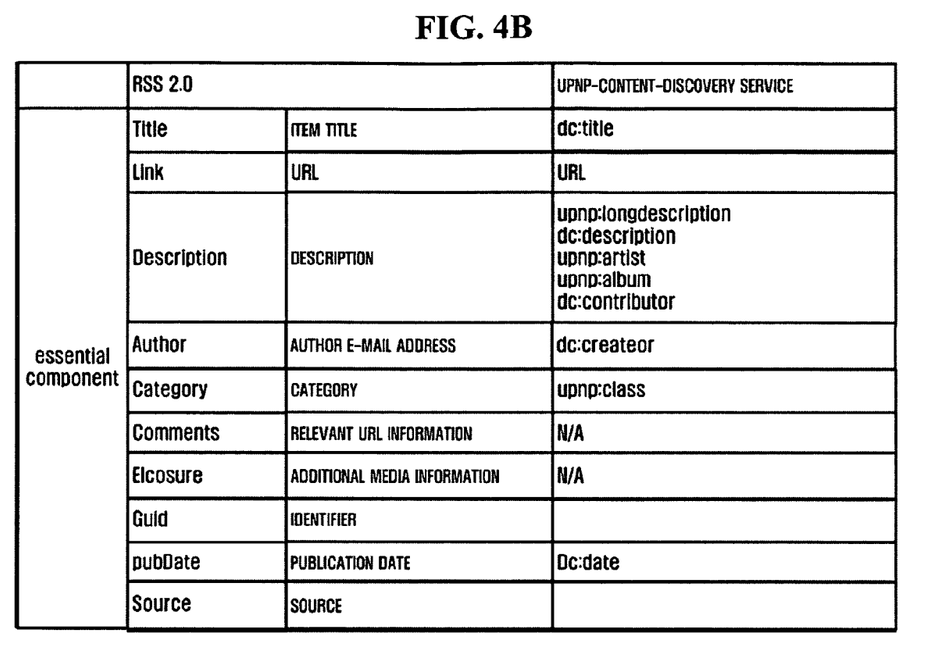

FIGS. 4A and 4B are diagrams illustrating components of a channel and an item according to an exemplary embodiment of the present invention, in which FIG. 4A illustrates components of the channel and FIG. 4B illustrates components of the item.

As shown in FIGS. 4A and 4B, a list of content sent by the media server 100 to the RSS service agent 200 includes information on the directory service of UPnP content. Here, essential component means information which the media server 100 must send to the RSS service agent 200, and optional component means information that the media server 100 may optionally provide.

For example, channel components of UPnP are channel title (dc:title), website URL (Presentation URL) and channel description (upnp:longDescription, dc:description), and channel components of RSS are channel title (title), website URL (link) and channel description (description).

That is, if the media server 100 provides content information through channel components used in UPnP, the RSS service agent converts the content information into RSS format, for example channel title (dc: title→title), website URL (Presentation URL→link), and channel description (upnp:longDescription, dc:description→description).

A method of converting content information received from the media server 100 into an RSS channel by the RSS service agent 200 is described in the following. Here, the media server 100 is configured with containers and items, and the RSS format is configured with a plurality of channels containing corresponding items (files) and has no sub-channels.

There are two methods of converting the containers and items in the media server 100 into an RSS channel. First, a method of providing an RSS channel by excluding sub-containers in a specific container in the media server 100. Second, a method of providing all items in sub-containers of a specific container in the media server 100. In the first method, items in a corresponding container in the media server 100 are provided through RSS channels, but excluding sub-containers. In the second method, all items in sub-containers of a corresponding container in the media server 100 are provided as items in one RSS channel. The two methods can be implemented to provide an RSS service by a browse or search action in the media server 100.

Figure 5:
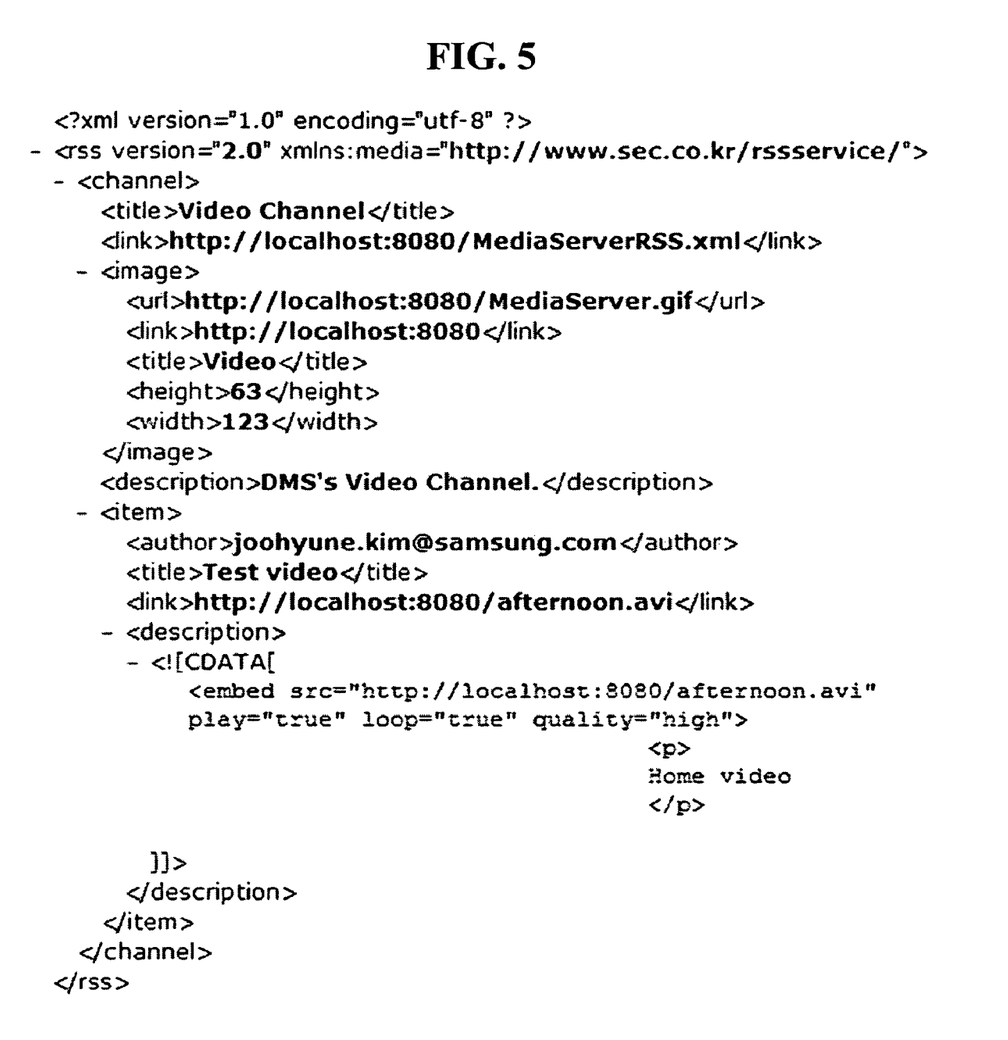
FIG. 5 is a diagram illustrating components of an RSS data according to an exemplary embodiment of the present invention.

FIG. 5 is a diagram illustrating components of RSS data, according to an exemplary embodiment of the present invention.

As shown, the RSS service agent 200 generates RSS data in order to provide RSS information requested by the RSS reader 300.

For example, the RSS data is generated with channel and item components as shown in FIGS. 4A and 4B. Here, information for the essential components of the RSS channel is always included, while information for the optional components may be optionally provided.

Additionally, when providing description information for an RSS item, if an item of a container is a music or video file it is tagged with the Hyper Text Markup Language (HTML) "<embed>" tag, and if an item of a container is an image file, then it is tagged with the HTML "<img>" tag.

Figure 6:
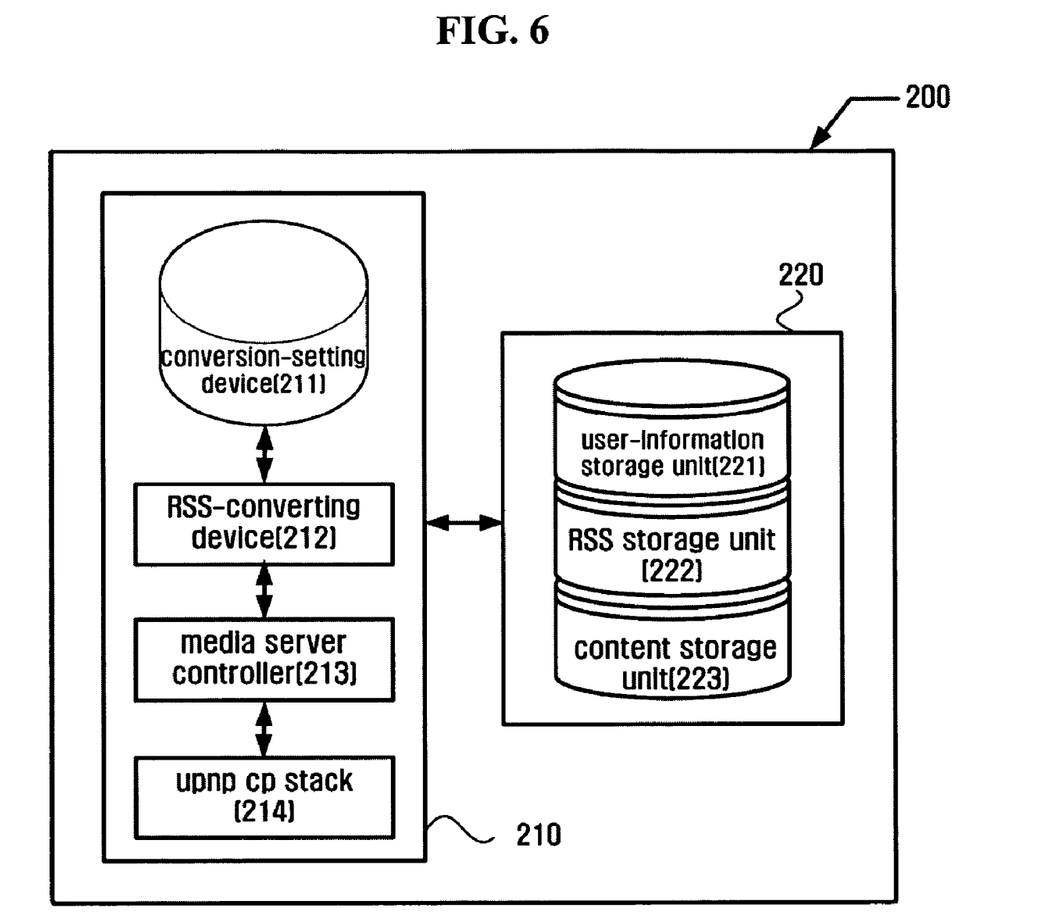
FIG. 6 is a block diagram illustrating the RSS service agent of the system for providing content in a media server according to an exemplary embodiment of the present invention.

FIG. 6 is a block diagram illustrating the RSS service agent of the system for providing content stored in a media server according to an exemplary embodiment of the present invention.

As shown, the RSS service agent 200 includes an RSS-converting unit 210, which requests a browse or search action and converts content information collected through the browse and search action, and a web service unit 220, which provides an RSS service to outside. Here, the RSS-converting unit 210 and the web service unit 220 of the RSS service agent 200 can be physically combined or separated from each other.

The RSS-converting unit 210 includes a conversion-setting device 211, which has information on the channel components, an RSS-converting device 212, which converts content information collected through a browse action, search action or an event into an RSS data, a media server controller 213, which processes media server and content directory services according to the UPnP standard, and an UPnP CP stack 214, which process basic UPnP CP functions.

For example, the media server controller 213 requests a browse action or search action from the media server 100. Further, the UPnP CP stack 214 finds the media server 100 through a discovery process, and makes a request to the media server 100 corresponding to the request made by the media server controller 213.

The web service unit 220 includes a user-information storage unit 221, which stores user information for the web service and the RSS service, an RSS storage unit 222, which stores RSS information of the media server 100, and a content storage unit 223, which stores content of the media server 100. Here, when there is more than one media server, the RSS information can be stored for each media server.

The term "unit", as used herein, means, but is not limited to, a software or hardware component, such as a Field Programmable Gate-Array (FPGA) or Application-Specific Integrated Circuit (ASIC), which performs certain tasks. A "unit" may advantageously be configured to reside on the addressable storage medium and configured to execute on one or more processors. Thus, a "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and modules or further separated into additional components and modules.

Figure 7:
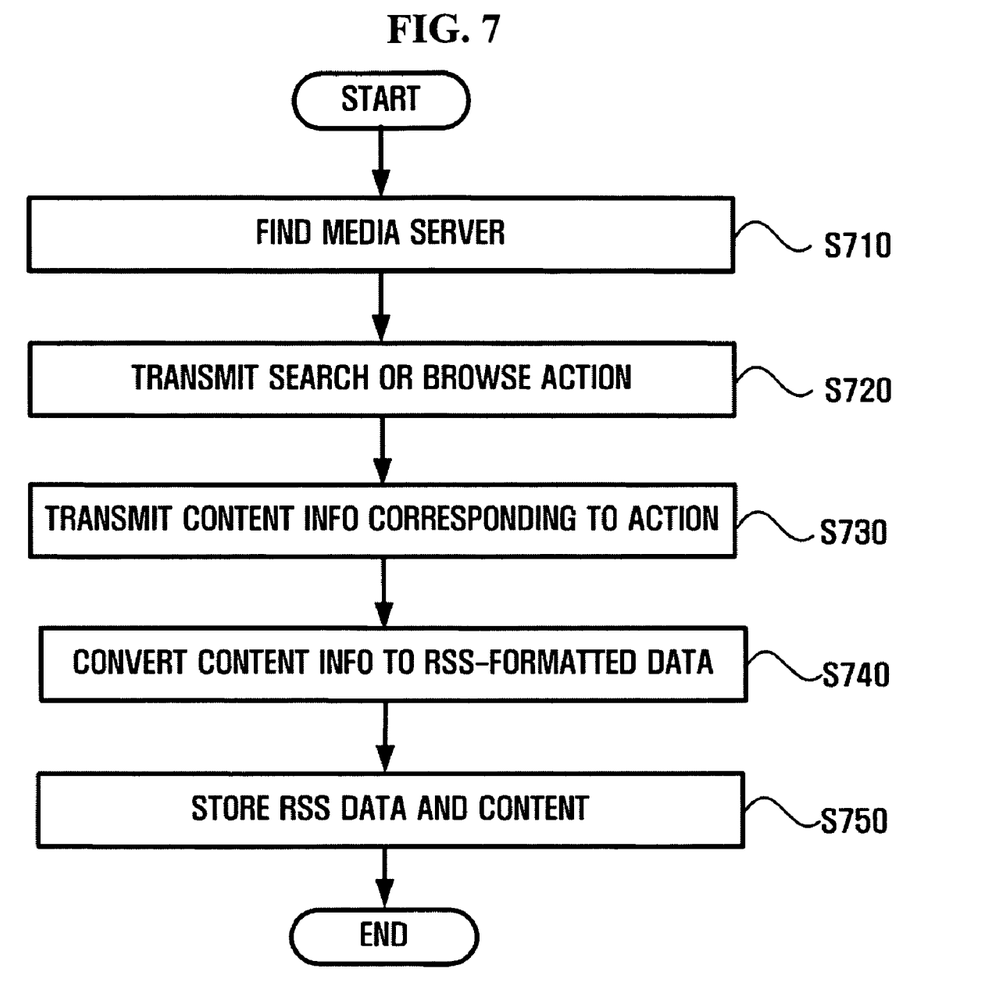
FIG. 7 is a flow chart illustrating a process of collecting content in a method of providing content in a media server according to another exemplary embodiment of the present invention.

FIG. 7 is a flow chart illustrating a process of collecting content in a method of providing content in a media server, according to another exemplary embodiment of the present invention.

First, the UPnP CP stack 214 of the RSS service agent 200 finds the media server 100 (operation S710). Here, the UPnP CP stack 214 finds the media server 100 through a discovery process.

Next, the conversion-setting device 211 identifies the media server 100 according to information provided by user settings, and requests a browse or search action depending on values set by the media server controller 213. Here, the process executes by having a name and a universally unique identifier (UUID) of the media server act as a base.

Next, the media server controller 213 transmits a corresponding action to the media server 100 via the UPnP CP stack 214 (operation S720).

Next, when content information corresponding to an action is transmitted from the media server 100 (operation S730), the RSS-converting device 212 converts the content information into RSS data (operation S740). Here, the process of converting into RSS data has already been described with reference to FIGS. 4A and 4B.

Next, the RSS data is stored in the RSS storage unit 222 of the web service unit 220, and corresponding content are stored in the content storage unit 223 according to user settings (operation S750).

Meanwhile, when a user registers content in the media server 100, the RSS service agent 200 is notified through a UPnP event, and updates the content through the browse action.

Figure 8:
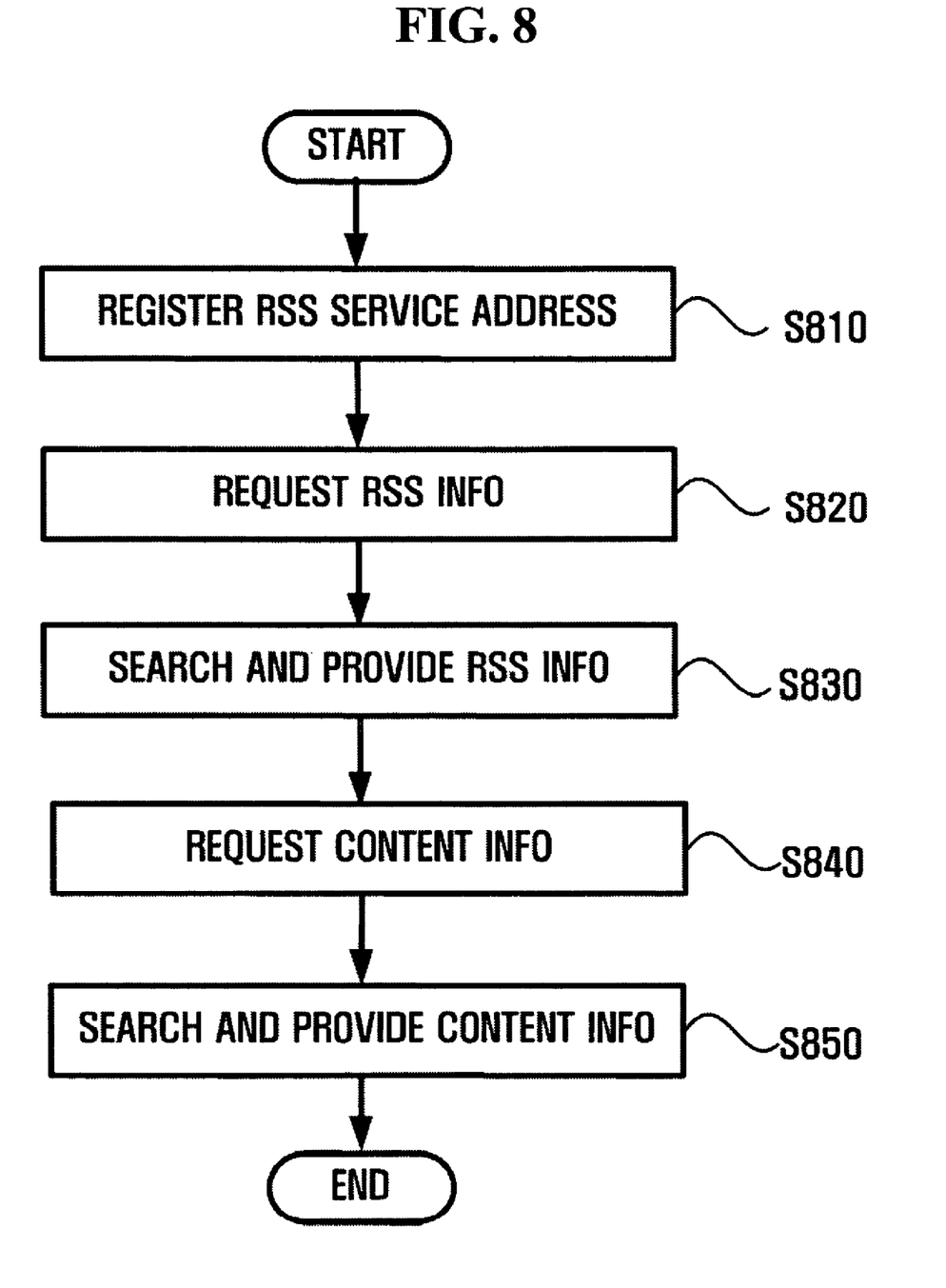
FIG. 8 is a flow chart illustrating a process of providing an RSS service through an RSS reader in a method of providing content in a media server according to another exemplary embodiment of the present invention.

FIG. 8 is a flow chart illustrating a process of providing an RSS service through an RSS reader in a method of providing content stored in a media server, according to an exemplary embodiment of the present invention.

First, a user registers an RSS service address of the RSS service agent 200 (operation S810). Here, when the user requests an RSS feed, the RSS feed is registered and this action is stored in the user-information storage unit 221.

Next, the RSS reader 300 makes a request for RSS information to the RSS service agent 200 (operation S820). The web service unit 220 of the RSS web service agent 200 searches for RSS information stored in the RSS storage unit 222, and transmits the found RSS information (operation S830). Here, the RSS information is transmitted as the RSS data described in FIG. 5.

Next, when the RSS reader 300 makes a request for content information to the RSS service agent 200 (operation S840), the web service unit 220 searches content information stored in the content storage unit 223 and transmits the searched content information to the RSS reader 300 (operation S850).

Accordingly, the user can be provided with a list of content in the media server 100 through the RSS reader 300.

Figure 9A:
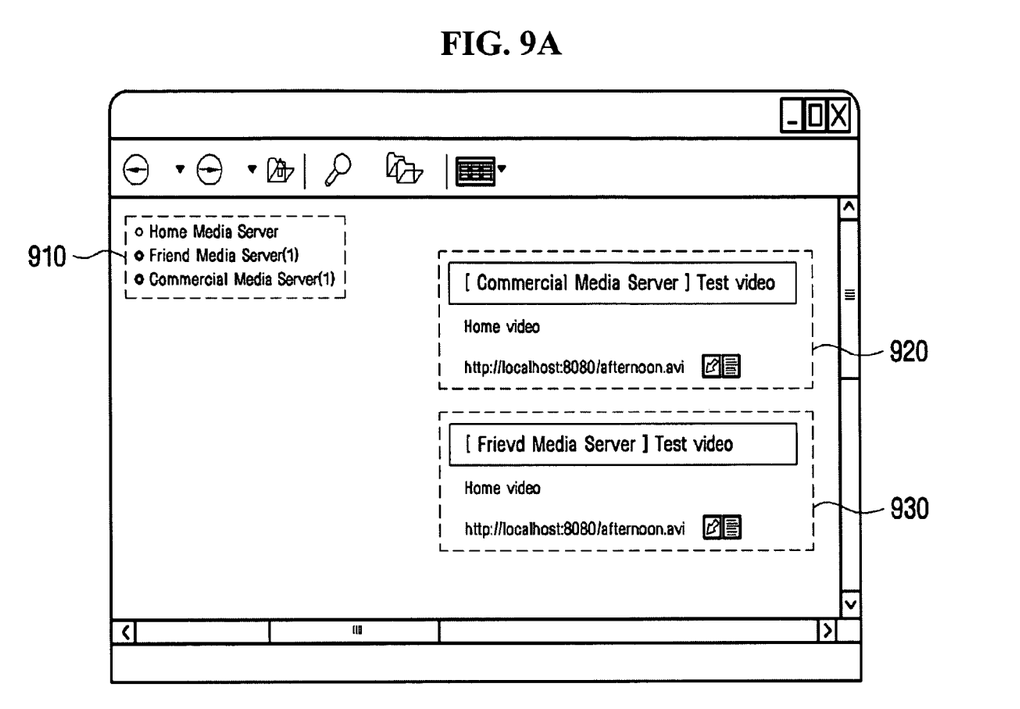
FIGS. 9A and 9B are diagrams illustrating an RSS service provided through an RSS reader according to another exemplary embodiment of the present invention.
Figure 9B:
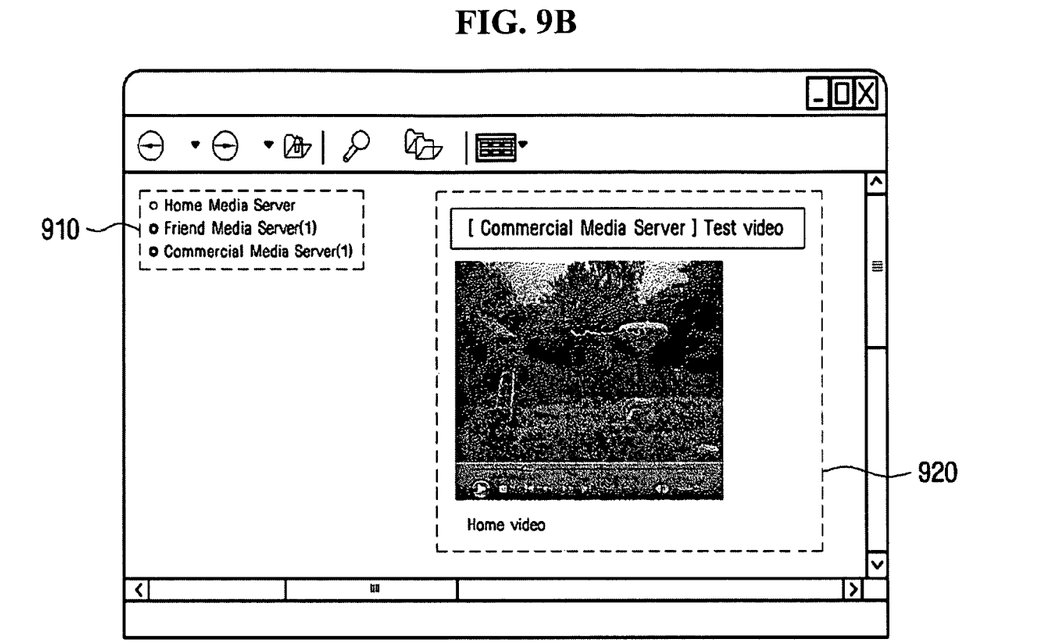

FIGS. 9A and 9B are diagrams illustrating an RSS service provided through an RSS reader according to another exemplary embodiment of the present invention.

As shown in FIG. 9A, a channel 910 of a home media server, a friend media server, or a commercial media server and items 920 and 930 of the channel 910 are provided to the RSS reader 300.

Additionally, a video included in the item of the commercial media server in FIG. 9A is played in the RSS reader 300, as shown in FIG. 9B.

Accordingly, content in the media server 100 can be provided as RSS data (for example, channels and items) to allow the access of content in the media server 100 through the RSS reader 300.

As described above, an apparatus, a method and a system for providing content in a media server, according to the present invention, provide at least one of the following advantages.

By expressing content in a media server as RSS data, content in the media server can be accessed through an RSS reader.

In addition, in technologies disclosed in the present invention, which provide the access to content in a media server through an RSS reader, content can be registered in the media server, which makes it possible to provide the content to many users, in addition to a customized broadcasting system to individual users.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in descriptive sense only and not for purposes of limitation.

What is claimed is:

1. An apparatus for providing content in a media server, the apparatus comprising:
    a processor comprising a really simple syndication (RSS)-converting unit which transmits to the media server a Universal Plug and Play (UPnP) request for UPnP content directory service (CDS) information of the content, receives from the media server the UPnP CDS information as at least one of UPnP channel components and UPnP item components, and converts the at least one of UPnP channel components and UPnP item components into RSS components using a database associating the UPnP channel components, the UPnP item components, and the RSS components; and
    a web service unit which receives from an RSS reader a request for RSS information of the content in the media server and transmits the RSS components to the RSS reader.

2. The apparatus of claim 1, wherein the RSS-converting unit comprises:
    a media server controller which transmits the request to the media server, the request to perform a UPnP browse action or a UPnP search action for collecting the at least one of UPnP channel components and UPnP item components; and
    an RSS-converting device which converts the at least one of UPnP channel components and UPnP item components collected through the UPnP browse action or the UPnP search action into the RSS components.

3. The apparatus of claim 1, wherein the web service unit comprises:
    an RSS storage unit which stores the RSS components; and
    a content storage unit which stores content corresponding to the CDS information.

4. The apparatus of claim 1, wherein the RSS-converting unit and the web service unit are structurally separate from each other.

5. A system for providing content in a media server, the system comprising:
    a really simple syndication (RSS) service agent comprising a processor which transmits to the media server a Universal Plug and Play (UPnP) browse action or a UPnP search action for UPnP content directory service (CDS) information of the content, receives from the media server the UPnP CDS information as at least one of UPnP channel components and UPnP item components, and converts the at least one of UPnP channel components and UPnP item components into RSS components using a database associating the UPnP channel components, the UPnP item components, and the RSS components;
    the media server which searches containers and items, and generates and transmits the UPnP CDS information in response to receiving the UPnP browse action or the UPnP search action from the RSS service agent; and
    an RSS reader which requests the RSS service agent for RSS information of the content in the media server, receives the RSS components from the RSS service agent, and accesses the content using the RSS components.

6. The system of claim 5, wherein the RSS service agent comprises:
    an RSS-converting unit which converts the least one of UPnP channel components and UPnP item components into the RSS components; and
    a web service unit which provides RSS data generated by the RSS-converting unit to the RSS reader.

7. The system of claim 6, wherein the RSS-converting unit comprises:
    a media server controller which transmits the request to the media server, the request to perform the UPnP browse action or the UPnP search action; and
    an RSS-converting device which converts the at least one of UPnP channel components and UPnP item components into the RSS components.

8. The system of claim 6, wherein the web service unit comprises:
    an RSS storage unit which stores the RSS components; and
    a content storage unit which stores content corresponding to the CDS information.

9. The system of claim 6, wherein the RSS-converting unit and the web service unit are structurally separate from each other.

10. A method of providing content in a media server, the method comprising:
    transmitting, by a really simple syndication (RSS) service agent comprising a processor, to the media server a Universal Plug and Play (UPnP) browse action or a UPnP search action for UPnP content directory service (CDS) information of the content;
    receiving from the media server the UPnP CDS information as at least one of UPnP channel components and UPnP item components;
    converting the at least one of UPnP channel components and UPnP item components into RSS components using a database associating the UPnP channel components, the UPnP item components, and the RSS components;
    receiving from an RSS reader a request for RSS information of the content in the media server; and
    providing the RSS components to the RSS reader.

11. The method of claim 10, wherein content corresponding to the RSS components and the collected CDS information are stored separately.

* * * * *